United States Patent
Talwar et al.

(10) Patent No.: US 11,463,450 B2
(45) Date of Patent: Oct. 4, 2022

(54) LOCATION-BASED DETECTION OF UNAUTHORIZED USE OF INTERACTIVE COMPUTING ENVIRONMENT FUNCTIONS

(71) Applicant: EQUIFAX INC., Atlanta, GA (US)

(72) Inventors: Hrishi Talwar, Atlanta, GA (US); Prasad Shetty, Atlanta, GA (US)

(73) Assignee: EQUIFAX INC., Atlanta, GA (US)

( * ) Notice: Subject to any disclaimer, the term of this patent is extended or adjusted under 35 U.S.C. 154(b) by 194 days.

(21) Appl. No.: 16/500,788

(22) PCT Filed: Apr. 13, 2018

(86) PCT No.: PCT/US2018/027518
§ 371 (c)(1),
(2) Date: Oct. 3, 2019

(87) PCT Pub. No.: WO2018/191638
PCT Pub. Date: Oct. 18, 2018

(65) Prior Publication Data
US 2021/0282018 A1 Sep. 9, 2021

Related U.S. Application Data

(60) Provisional application No. 62/485,037, filed on Apr. 13, 2017.

(51) Int. Cl.
*H04L 29/06* (2006.01)
*H04L 9/40* (2022.01)
(Continued)

(52) U.S. Cl.
CPC ....... *H04L 63/107* (2013.01); *G06Q 20/3224* (2013.01); *G06Q 20/40155* (2020.05);
(Continued)

(58) Field of Classification Search
CPC .... H04L 63/107; H04W 12/63; H04W 12/69; H04W 12/06; H04W 12/069; G06Q 20/40155; G06Q 20/3224
See application file for complete search history.

(56) References Cited

U.S. PATENT DOCUMENTS 5,960,411 A 9/1999 Hartman et al.
6,944,669 B1 9/2005 Saccocio
(Continued)

FOREIGN PATENT DOCUMENTS

CA 2413340 C 10/2009
KR 20130103697 A 9/2013
(Continued)

OTHER PUBLICATIONS

U.S. Appl. No. 16/328,595, "Notice of Allowance", dated Aug. 19, 2020, 18 pages.
(Continued)

Primary Examiner — Jeffrey C Pwu
Assistant Examiner — Thong P Truong
(74) Attorney, Agent, or Firm — Kilpatrick Townsend & Stockton LLP

(57) ABSTRACT

In some aspects, a computing system can obtain, via a first communication channel with a host server, a data network identifier that identifies a mobile device accessing an interactive computing environment provide by a host server. The computing system can generate, from communications with a telecommunication provider server via a second communication channel, a dynamic identity-verification element that includes the data network identifier and a location identifier that identifies a geographic location of the mobile device. The computing system can match the dynamic identity-verification element to a device-and-location combination indicating unauthorized use of the host server by
(Continued)

the mobile device. The computing system can prevent the mobile device from accessing a function for advancing an electronic transaction within the interactive computing environment.

20 Claims, 6 Drawing Sheets

(51) Int. Cl.
*H04W 12/63* (2021.01)
*H04W 12/069* (2021.01)
*G06Q 20/40* (2012.01)
*H04W 12/69* (2021.01)
*G06Q 20/32* (2012.01)
*H04W 12/06* (2021.01)
*H04W 12/30* (2021.01)

(52) U.S. Cl.
CPC ......... *H04W 12/06* (2013.01); *H04W 12/069* (2021.01); *H04W 12/30* (2021.01); *H04W 12/63* (2021.01); *H04W 12/69* (2021.01)

(56) References Cited

U.S. PATENT DOCUMENTS

| | | | |
|---|---|---|---|
| 7,080,049 | B2 | 7/2006 | Truitt et al. |
| 8,045,956 | B2 | 10/2011 | Sun et al. |
| 8,121,941 | B2 | 2/2012 | Matthews et al. |
| RE44,513 | E | 10/2013 | Nobrega et al. |
| 8,577,803 | B2 | 11/2013 | Chatterjee et al. |
| 8,996,423 | B2 | 3/2015 | Johnson et al. |
| 9,112,857 | B2 | 8/2015 | Coppinger |
| 9,799,027 | B2 | 10/2017 | Pasa et al. |
| 10,115,102 | B2 | 10/2018 | Burrell et al. |
| 10,863,359 | B2 | 12/2020 | Talwar |
| 2003/0101136 | A1 | 5/2003 | Wheeler et al. |
| 2004/0006535 | A1 | 1/2004 | Forbes, Jr. et al. |
| 2004/0122684 | A1 | 6/2004 | Kaikuranta |
| 2004/0168054 | A1 | 8/2004 | Halasz et al. |
| 2004/0177252 | A1 | 9/2004 | Mallee et al. |
| 2004/0230534 | A1 | 11/2004 | McGough |
| 2004/0259626 | A1 | 12/2004 | Akram et al. |
| 2005/0272465 | A1 | 12/2005 | Ahmavaara et al. |
| 2006/0041755 | A1 | 2/2006 | Pemmaraju |
| 2006/0233332 | A1 | 10/2006 | Toms |
| 2006/0235761 | A1 | 10/2006 | Johnson et al. |
| 2006/0235796 | A1 | 10/2006 | Johnson et al. |
| 2007/0178883 | A1 | 8/2007 | Nandagopal |
| 2007/0244831 | A1 | 10/2007 | Kuo |
| 2007/0255646 | A1 | 11/2007 | Morris et al. |
| 2007/0255662 | A1 | 11/2007 | Tumminaro |
| 2007/0265928 | A1 | 11/2007 | Fuchs et al. |
| 2008/0044031 | A1 | 2/2008 | Mishra |
| 2009/0036111 | A1 | 2/2009 | Danford et al. |
| 2009/0276368 | A1 | 11/2009 | Martin et al. |
| 2009/0300097 | A1 | 12/2009 | Meyer |
| 2010/0095359 | A1 | 4/2010 | Gordon |
| 2010/0125737 | A1 | 5/2010 | Kang |
| 2010/0218241 | A1 | 8/2010 | Faryna |
| 2011/0238580 | A1 | 9/2011 | Coppinger |
| 2011/0247045 | A1 | 10/2011 | Rajagopal et al. |
| 2011/0270751 | A1 | 11/2011 | Csinger et al. |
| 2011/0295750 | A1 | 12/2011 | Rammal |
| 2011/0296513 | A1* | 12/2011 | Kasad .................. H04L 63/107 726/9 |
| 2011/0320347 | A1 | 12/2011 | Tumminaro et al. |
| 2012/0030110 | A1 | 2/2012 | Prakash et al. |
| 2012/0150750 | A1 | 6/2012 | Law et al. |
| 2012/0203605 | A1 | 8/2012 | Morgan et al. |
| 2012/0209749 | A1 | 8/2012 | Hammad et al. |
| 2012/0240204 | A1 | 9/2012 | Bhatnagar et al. |
| 2012/0300932 | A1 | 11/2012 | Cambridge et al. |
| 2012/0331532 | A1 | 12/2012 | Walters et al. |
| 2013/0024371 | A1 | 1/2013 | Hariramani et al. |
| 2013/0226792 | A1 | 8/2013 | Kushevsky et al. |
| 2013/0262311 | A1 | 10/2013 | Buhrmann et al. |
| 2013/0309999 | A1 | 11/2013 | Modiano |
| 2014/0109175 | A1 | 4/2014 | Barton et al. |
| 2014/0122226 | A1 | 5/2014 | Downing et al. |
| 2014/0136346 | A1 | 5/2014 | Teso |
| 2014/0258136 | A1 | 9/2014 | Ellis |
| 2014/0279523 | A1 | 9/2014 | Lynam et al. |
| 2014/0282897 | A1 | 9/2014 | Stuntebeck |
| 2015/0026049 | A1 | 1/2015 | Theurer et al. |
| 2015/0046339 | A1 | 2/2015 | Wong et al. |
| 2015/0088751 | A1 | 3/2015 | Grigg et al. |
| 2015/0106270 | A1 | 4/2015 | Burrell et al. |
| 2015/0149359 | A1* | 5/2015 | Forte .................. G06Q 20/3224 705/44 |
| 2015/0350177 | A1 | 12/2015 | Sharp et al. |
| 2016/0171555 | A1 | 6/2016 | Buerger et al. |
| 2016/0277380 | A1 | 9/2016 | Wagner et al. |
| 2016/0300231 | A1 | 10/2016 | Shavell et al. |
| 2016/0381038 | A1 | 12/2016 | Disraeli |
| 2017/0178142 | A1 | 6/2017 | Dutt et al. |
| 2017/0221055 | A1 | 8/2017 | Carlsson et al. |
| 2018/0204234 | A1 | 7/2018 | Hermoni et al. |
| 2020/0145385 | A1 | 5/2020 | Chauhan et al. |
| 2021/0044976 | A1 | 2/2021 | Avetisov et al. |

FOREIGN PATENT DOCUMENTS

| | | |
|---|---|---|
| KR | 1020130103697 A | 9/2013 |
| WO | 2006113834 A2 | 10/2006 |
| WO | 2010088757 A1 | 8/2010 |
| WO | 2013166507 A1 | 11/2013 |
| WO | 2013181151 A2 | 12/2013 |
| WO | 2015057538 | 4/2015 |

OTHER PUBLICATIONS

U.S. Appl. No. 14/512,493, "Final Office Action", dated Apr. 30, 2018, 11 pages.
U.S. Appl. No. 14/512,493, "Non-Final Office Action", dated Jul. 14, 2017, 17 pages.
U.S. Appl. No. 14/512,493, "Notice of Allowance", dated Jun. 29, 2018, 18 pages.
AU2014334713, "First Examination Report", dated May 1, 2019, 4 pages.
EP14853685.7, "Extended European Search Report", dated Mar. 10, 2017, 7 pages.
EP14853685.7, "Office Action", dated Sep. 13, 2018, 7 pages.
EP14853685.7, "Summons to Attend Oral Proceedings", dated Aug. 13, 2019, 10 pages.
PCT/US2014/060217, "International Search Report and Written opinion", dated Jan. 12, 2015, 11 pages.
PCT/US2018/027518, "International Search Report and Written Opinion", dated Jul. 26, 2018, 17 pages.
PCT/US2018/040055, "International Search Report and Written Opinion", dated Nov. 14, 2018, 12 pages.
PCT/US2018/065376, "International Search Report and Written Opinion", dated Mar. 25, 2019, 14 pages.
U.S. Appl. No. 16/328,595, "Notice of Allowance", dated Jun. 25, 2020, 26 pages.
AU2014334713, "Second Examination Report", dated Dec. 24, 2019, 4 pages.
AU2014334713, "Third Examination Report", dated Apr. 30, 2020, 4 pages.
EP14853685.7, "Summons to Attend Oral Proceedings", dated Apr. 6, 2020, 23 pages.
EP14853685.7, "Summons to Attend Oral Proceedings", dated Nov. 15, 2019, 18 pages.
IN201637008409, "First Examination Report", dated Nov. 28, 2019, 6 pages.
PCT/US2018/027518, "International Preliminary Report on Patentability", dated Oct. 24, 2019, 12 pages.
PCT/US2018/040055, "International Preliminary Report on Patentability", dated Jan. 9, 2020, 8 pages.

(56) References Cited

OTHER PUBLICATIONS

PCT/US2018/065376, "International Preliminary Report on Patentability", dated Jun. 25, 2020, 10 pages.
U.S. Appl. No. 16/146,256, "Non-Final Office Action", dated Oct. 27, 2020, 21 pages.
U.S. Appl. No. 16/160,639, "Non-Final Office Action", dated Oct. 30, 2020, 13 pages.
EP18784109.3, "Extended European Search Report", dated Nov. 2, 2020, 9 pages.
Kumar, "An Overview of Hypertext Transfer Protocol Service Security on Business Domain", 2012 International Conference on Management and Education Innovation IPEDR, vol. 37, 2012, pp. 285-289.
Molina, et al., "Database Systems The Complete Book", Pearson Prentice Hall Inc., 2009, pp. 1-1204.
U.S. Appl. No. 16/160,639, "Final Office Action", dated Feb. 8, 2021, 13 pages.
Australian Patent Application No. 2018291152, "First Examination Report", dated Dec. 21, 2020, 4 pages.
Canadian Patent Application No. 2,924,009, "Office Action", dated Dec. 29, 2020, 3 pages.
Canadian Patent Application No. 3,067,821, "Notice of Allowance", dated Jan. 6, 2021, 1 pages.
International Application No. PCT/US2014/060217, "International Preliminary Report on Patentability", dated Apr. 28, 2016, 8 pages.
U.S. Appl. No. 16/146,256, "Final Office Action", dated Mar. 19, 2021, 19 pages.
European Patent Application No. 18822628.6, "Extended European Search Report", dated Feb. 23, 2021, 9 pages.
European Patent Application No. 21159404.9, "Extended European Search Report", dated Mar. 31, 2021, 10 pages.
U.S. Appl. No. 16/146,256, "Non-Final Office Action", dated Dec. 17, 2021, 24 pages.
U.S. Appl. No. 16/160,639, "Non-Final Office Action", dated Oct. 28, 2021, 17 pages.
Australian Patent Application No. 2018291152, "Notice of Acceptance", dated Oct. 27, 2021, 3 pages.
Australian Patent Application No. 2018291152, "Second Examination Report", dated Apr. 26, 2021, 3 pages.
Australian Patent Application No. 2018291152, "Third Examination Report", dated Sep. 21, 2021, 2 pages.
Australian Patent Application No. 2020202925, "First Examination Report", dated Jun. 23, 2021, 6 pages.
Canadian Patent Application No. CA2,924,009, "Office Action", dated Oct. 13, 2021, 2 pages.
U.S. Appl. No. 16/146,256, "Notice of Allowance", dated Apr. 6, 2022, 7 pages.
U.S. Appl. No. 16/160,639, "Final Office Action", dated Apr. 8, 2022, 18 pages.
U.S. Appl. No. 16/772,568, "Non-Final Office Action", dated Jan. 18, 2022, 14 pages.
Australian Patent Application No. 2018253294, "First Examination Report", dated Dec. 23, 2021, 4 pages.
Australian Patent Application No. 2020202925, "Second Examination Report", dated Dec. 24, 2021, 4 pages.
European Patent Application No. 18822628.6, "Notice of Decision to Grant", dated Mar. 24, 2022, 2 pages.
Vielhauer, "Fundamentals in User Authentication: Techniques for Binding Identities to Information", Biometric User Authentication for it Security: From Fundamentals to Handwriting, 2006, pp. 77-115.
U.S. Appl. No. 16/146,256, "Notice of Allowance", dated May 19, 2022, 7 pages.
U.S. Appl. No. 16/160,639, "Advisory Action", dated Jun. 14, 2022, 5 pages.
U.S. Appl. No. 16/772,568, "Notice of Allowance", dated May 5, 2022, 11 pages.
U.S. Appl. 16/772,568, "Supplemental Notice of Allowability", dated May 18, 2022, 4 pages.
AU2020202925, "Third Examination Report", dated May 31, 2022, 5 pages.
EP18784109.3, "Notice of Decision to Grant", dated Jun. 17, 2022, 2 pages.

\* cited by examiner

LOCATION-BASED DETECTION OF UNAUTHORIZED USE OF INTERACTIVE COMPUTING ENVIRONMENT FUNCTIONS

CROSS REFERENCE TO RELATED APPLICATIONS

This disclosure claims the benefit of priority of U.S. Provisional Application No. 62/485,037, titled "Location-Based Fraud Detection During Online Transactions" and filed on Apr. 13, 2017, which is hereby incorporated in its entirety by this reference.

TECHNICAL FIELD

This disclosure generally relates to information security, and more particularly relates to performing location-based operations for preventing fraudulent or other unauthorized use by the mobile device of one or more functions provided by an interactive computing environment.

BACKGROUND

Interactive computing environments, such as web-based applications or other online software platforms, allow users to perform various computer-implemented functions through graphical interfaces. A given interactive environment can allow a user device to access different graphical interfaces providing different types of functionality, such as searching databases for different content items, selecting the content items by storing them in a temporary memory location, and causing a server to perform one or more operations based on a selected combination of content items.

But individuals engaging in fraud or other unauthorized online activity may use the relative anonymity provided by the Internet to access various functions within an interactive computing environment. For example, a fraudster may obtain confidential data for another individual, access the interactive computing environment using the illicitly obtained confidential data, and implement one or more functions within the computing environment that are attributable to the owner of the confidential data rather than the fraudster. Thus, a mobile device's ability to remotely access an interactive computing environment via a data network presents unique risks of fraud or other unauthorized use of online functions.

SUMMARY

In some aspects, a computing system can obtain, via a first communication channel with a host server, a data network identifier that identifies a mobile device accessing an interactive computing environment provided by a host server. The computing system can generate, from communications with a telecommunication provider server via a second communication channel, a dynamic identity-verification element that includes the data network identifier and a location identifier that identifies a geographic location of the mobile device. The computing system can match the dynamic identity-verification element to a device-and-location combination indicating unauthorized use of the host server by the mobile device. The computing system can prevent the mobile device from accessing a function for advancing an electronic transaction within the interactive computing environment.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim. The foregoing, together with other features and examples, will become more apparent upon referring to the following specification, claims, and accompanying drawings.

BRIEF DESCRIPTION OF THE DRAWINGS

Aspects of the present disclosure can be better understood with reference to the following diagrams. The drawings are not necessarily to scale, with emphasis instead being placed upon clearly illustrating certain features of the disclosure.

DETAILED DESCRIPTION

Figure 1:
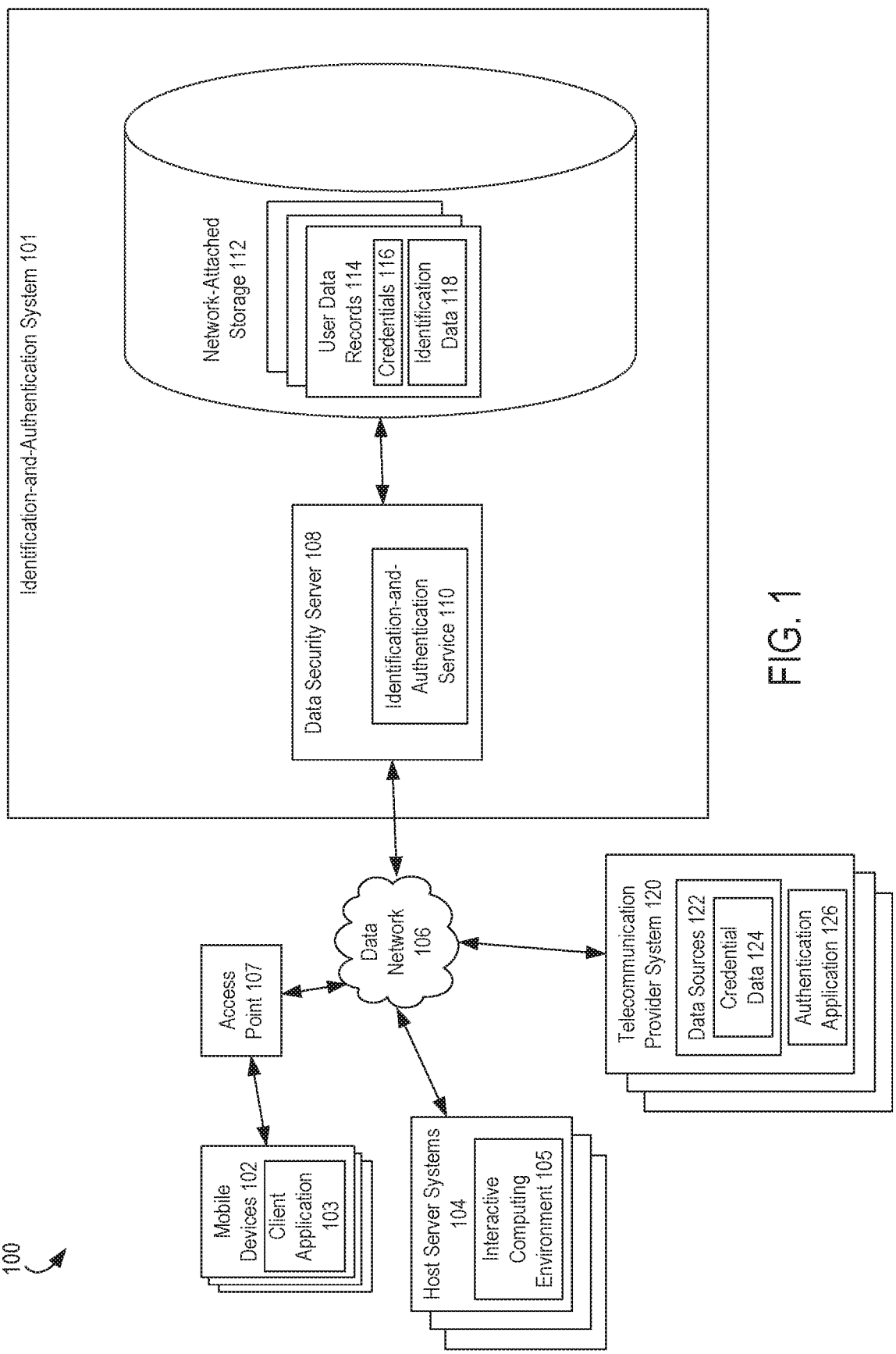
FIG. 1 depicts an example of performing location-based operations for preventing a mobile device's fraudulent or other unauthorized use of functions within an interactive computing environment, according to some aspects of the present disclosure.

Certain aspects of this disclosure relate to performing location-based operations for preventing a mobile device's fraudulent or other unauthorized use of functions within an interactive computing environment. For instance, an identification-and-authentication system can prevent fraudulent or otherwise unauthorized use of certain functions of an interactive computing environment during an online transaction (e.g., via a mobile website or other mobile application) by, for example, notifying a host server system providing the interactive computing environment that a fraudulent or unauthorized user should be prevented from completing the online transaction.

To do so, the identification-and-authentication system can communicate both with the host server system and one or more telecommunication providers, which allow mobile devices to communicate via data networks. The identification-and-authentication system can generate, based on communications with telecommunication providers, dynamic identity-verification elements indicating locations of mobile devices during online transactions with interactive computing environments. The dynamic identity-verification element could indicate that a mobile device is at a particular location that appears indicative of a fraudulent transaction, such as accessing a U.S.-based service despite the mobile device being located in another country. The identification-and-authentication system can prevent the mobile device from advancing the transaction within the interactive computing environment. Preventing the mobile device from advancing the transaction can include, for example, sending a control signal to the host server system to deny access to one or more functions of the interactive computing environment, refusing to provide identification data associated with the online transaction to the mobile device at the location, or some combination thereof.

In accordance with some aspects, the identification-and-authentication system can provide a common point-of-interface between various independent host server systems and independent telecommunication providers. For example, the identification-and-authentication system, which may be used by a host server system of identification information to host server systems, can service requests for user identification data by different host server systems. The identification-and-authentication system can service these requests using data network identifiers. The data network identifiers can identify mobile devices (e.g., a smart phone, tablet, e-reader, or laptop computer) involved in online transactions with the host server systems. The online transactions can be performed via interactive computing environments of the host server systems that are accessible via a web browser or a dedicated mobile application. Non-limiting examples of a data network identifier include an interne protocol ("IP") address assigned to a mobile computing device, a telephone number of a smart phone, etc. In some aspects, a mobile device may identify a user of the mobile via biometrics, data entry, or any other suitable process for identifying a user of a mobile device.

In some aspects, using the identification-and-authentication system as an interface between the host server system and a telecommunication provider facilitates fraud prevention in real time (e.g., between commencement and completion of an online transaction). For example, during a given transaction, the identification-and-authentication system can transmit a request to a telecommunication provider to identify the location of the mobile device and to provide a credential that is associated with a user of the mobile device. The identification-and-authentication system can receive, from the telecommunication provider, a response identifying the location and the credential. The identification-and-authentication system can perform one or more operations that allow the device location to be validated. If the device location is validated, the identification-and-authentication system can use the credential to retrieve identification data about the user. The identification-and-authentication system can provide the retrieved identification data to the host server system, the mobile device, or both for completing the online transaction. If the device location is not validated, the identification-and-authentication system can cause the host server system to prevent the mobile device from performing one or more function required for completing the online transaction.

A device location, which is provided to the identification-and-authentication system by a telecommunication provider, can be validated in any suitable manner. In some aspects, validating the device location can involve the identification-and-authentication system transmitting the device location to the host server system, which allows the host server system to determine if the device location is indicative of fraudulent activity and to notify the identification-and-authentication system that no identification data should be transmitted. In additional or alternative aspects, validating the device location can involve the identification-and-authentication system applying one or more rules, which may be obtained via communications with the host server system, to determine if the device location is indicative of fraudulent activity and to thereby decide that no identification data should be transmitted.

One or more features described herein can improve the operation of systems that detect unauthorized use of interactive computing environments accessible over the Internet or other data networks. For example, existing fraud-detection systems may rely on software installed on a mobile device to track the mobile device's location for fraud-detection purposes. Such software may be hacked or otherwise modified by a user of the mobile device. For instance, location services software on a mobile device can be reprogrammed to reflect a location that would not trigger fraud-detection logic on a remote system. The identification-and-authentication system can avoid this vulnerability of existing systems by using communications with telecommunication providers, rather than communications with a mobile device, to establish a location of the mobile device. For example, even if location services software on a mobile device has been reprogrammed to reflect a fraudulent location, the mobile device must still identify its correct location to a cellular tower to communicate via a data network. Thus, the location data provided directly to the identification-and-authentication system from the telecommunication provider may be more accurate for fraud-detection purposes than location data obtained from the mobile device itself.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Example of an Operating Environment

Referring now to the drawings, FIG. 1 depicts an example of a computing system 100 that performs location-based operations for preventing a mobile device's unauthorized use of functions within an interactive computing environment. FIG. 1 depicts examples of hardware components of an identification-and-authentication system 101 according to some aspects. The computing system 100 depicted in FIG. 1 is a specialized for performing extensive processing with respect to fraud detection, identity verification, and other operations using a large number of computer processing cycles.

The numbers of devices depicted in FIG. 1 are provided for illustrative purposes. Different numbers of devices may be used. For example, while certain devices or systems (e.g., a data security server 108, a network-attached storage unit 112, etc.) are shown as single devices in FIG. 1, multiple devices may instead be used to implement these devices or systems (e.g., a cloud or grid-based telecommunication network server system, a group of network-attached storage devices, etc.).

The computing system 100 includes an identification-and-authentication system 101. The identification-and-authentication system 101 can communicate with one or more host server systems 104. For example, host server systems 104 may send data to the data security server 108 to be processed or may send signals to the data security server 108 that control or otherwise influence different aspects of the identification-and-authentication system 101 or the data it is processing. The host server systems 104 may interact with the data security server 108 via one or more data networks 106. The host server systems 104 may also interact with the mobile devices 102 via one or more data networks 106 to facilitate online transactions between users of the mobile devices 102 and interactive computing environments 105 that are hosted by, provided by, or otherwise associated with the host server systems 104. The mobile device 102 can be communicatively coupled to one or more data networks 106 via one or more access points 107. An access point 107 can include communication infrastructure for connecting a mobile device to a telecommunication network, a wide-area network, or other data network through which the mobile device 102 could access the interactive computing environment 105. Examples of an access point 107 include a base station, a router, a gateway device, a microcell, etc.

Each host server system 104 may include one or more third-party devices (e.g., computing devices or groups of computing devices), such as individual servers or groups of servers operating in a distributed manner. A host server system 104 can include any computing device or group of computing devices operated by a seller, lender, or other provider of products or services. The host server system 104 can include one or more server devices. The one or more server devices can include, or can otherwise access, one or more non-transitory computer-readable media. The host server system 104 can also execute an interactive computing environment 105. The interactive computing environment 105 can include executable instructions stored in one or more non-transitory computer-readable media. The host server system 104 can further include one or more processing devices that are capable of executing the interactive computing environment 105 to perform operations described herein. In one example, the interactive computing environment 105 can provide an interface (e.g., a website, web server, or other server) to provide the mobile device 102 with access to certain online services, to engage in mobile commerce with a user of a mobile device 102, to provide the mobile device 102 with controlled access to electronic content, etc. The interactive computing environment 105 may transmit data to and receive data from the client application 103 to enable a transaction.

Each communication within the identification-and-authentication system 101 (e.g., between mobile devices 102 and the data security server 108, between host server systems 104 and the data security server 108, etc.) may occur over one or more data networks 106. A data network 106 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the data network 106.

A data network 106 may include network computers, sensors, databases, or other devices that may transmit or otherwise provide data to data security server 108. For example, a data network 106 may include local area network devices, such as routers, hubs, switches, or other computer networking devices. The data networks 106 can be incorporated entirely within (or can include) an intranet, an extranet, or a combination thereof. In one example, communications between two or more systems or devices can be achieved by a secure communications protocol, such as secure Hypertext Transfer Protocol ("HTTP") communications that use secure sockets layer ("SSL") or transport layer security ("TLS"). In addition, data or transactional details communicated among the various computing devices may be encrypted.

The identification-and-authentication system 101 can include one or more data security servers 108. The data security server 108 may be a specialized computer or other machine that processes the data received within the identification-and-authentication system 101. The data security server 108 may include one or more other systems. For example, the data security server 108 may include a database system for accessing the network-attached storage unit 112, a communications grid, or both. A communications grid may be a grid-based computing system for processing large amounts of data.

In some aspects, the data security server 108 can allow the identity-and-authentication system 101 to be an interface between various host server systems 104 and various telecommunication provider server systems 120. This architecture can facilitate the real-time provision of information from the identity-and-authentication system 101 to host server systems 104. This provision of information facilitates completion of online transactions, prevention of fraudulent transaction, or both in real time. Real time operation could involve performing the relevant operations, such as detection and prevention of fraudulent conduct, during an online transaction between the host server system 104 and a mobile device 102. For instance, real time operation could include detecting a potential unauthorized use of a particular function during an electronic transaction within the interactive computing environment and preventing the unauthorized use prior to completion of the transaction.

The data security server 108 can include one or more processing devices that execute program code, such as an identity-and-authentication service 110. The program code is stored on a non-transitory computer-readable medium. The identity-and-authentication service 110 can execute one or more processes for facilitating fraud detection and other aspects of online transactions between mobile devices 102 and host server systems 104 via interactive computing environments 105. The identity-and-authentication service 110 can include executable instructions stored in one or more non-transitory computer-readable media. In some aspects, the identity-and-authentication service 110 can include one or more modules, such as a web server module, a web services module, or an enterprise services module, which individually or in combination facilitate online transactions. For example, a web server module can be executed by a suitable processing device to provide one or more web pages or other interfaces to a mobile device 102, a host server system 104, or telecommunication provider server system 120. The web pages or other interfaces can include content provided by the web services module. The web services module can generate this content by executing one or more algorithms using information retrieved from one or more of the user data records 114. The enterprise services module can be executed to retrieve the information from one or more of the user data records 114.

The identification-and-authentication system 101 may also include one or more network-attached storage units 112. The network-attached storage unit 112 may store a variety of different types of data organized in a variety of different ways and from a variety of different sources. For example, the network-attached storage unit 112 may include storage other than primary storage located within data security server 108 that is directly accessible by processors located therein. In some aspects, the network-attached storage unit 112 may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The network-attached storage unit 112 can include memory devices for storing user data records 114 that include credentials 116 and identification data 118. The user data records 114 can be received by a data security server 108 via a data network 106, generated by the data security server 108 based on communications with mobile devices 102, generated by the data security server 108 based on communications with host server systems 104, or some combination thereof. The user data records 114 can be stored in, for example, a database or other suitable data source. Suitable data sources can include, for example, secure and credentialed databases or other data structures managed by or otherwise accessible by the identity-and-authentication service 110.

The user data records 114 can include identification data 118. Identification data 118 can include any information that can be used to uniquely identify an individual or other entity. In some aspects, identification data 118 can include information that can be used on its own to identify an individual or entity. Non-limiting examples of such identification data 118 include one or more of a legal name, a company name, a social security number, a credit card number, a date of birth, an e-mail address, etc. In other aspects, identification data 118 can include information that can be used in combination with other information to identify an individual or entity. Non-limiting examples of such identification data 118 include a street address or other geographical location, employment data, etc. In some aspects, information from the user data records 114 can be processed to generate derived data about a user (e.g., risk assessments, credit scores, etc.).

Each credential 116 can include information that can be used to uniquely identify a source of identification data regarding an individual or other entity. In some aspects, a credential 116 can include information that can be used on its own to identify the credit file or other data source including identification data of an individual or entity. Non-limiting examples of such a credential 116 include one or more of an account number, a legal name, an address, a social security number, a credit card number, etc.

In some aspects, the identification data 118 can include credit data. Credit data can include data associated with a user's credit file. A credit file can be a historical report that is prepared or provided by a credit bureau. For example, a credit file can include one or more of identification data, a credit card account, a loan, a bankruptcy, a late payment, an inquiry, a credit score, a credit card number, etc. In some aspects, a credit file can include additional data from data sources other than credit reporting data to augment the credit reporting data. Non-limiting examples of such additional data includes information obtained from utility providers, information obtained from wireless service providers, information obtained from credit card issuers, real estate data, etc. The user data records 114 can also include account data. Account data can include data associated with a user's credit account. For example, account data can include a user's name, address, an account number, authentication information (e.g., a personal identification number, a password, etc.), a username, etc. The user data records 114 can further include lender data. Lender data can include data associated with lenders of credit or money, or other financial product or service providers. For example, lender data can include data associated with a bank, trust, credit union, insurance company, brokerage firm, etc. The user data records 114 can also include any other relevant data, such as income and employment data, asset data, education data, etc. In some aspects, data from multiple user data records 114 can be linked to or otherwise associated with a given user using a referential keying system. The user data records 114 can be updated periodically or continuously.

In some aspects, the identification-and-authentication service 110 can execute one or more processes for detecting a fraudulent transaction. In one example, the identification-and-authentication service 110 can obtain location information about a mobile device 102 from a telecommunication provider server system 120 on behalf of a host server system 104. In another example, the identification-and-authentication service 110 can compare credit data or account data with data provided by one or more of the mobile device 102, the host server system 104, and the telecommunication provider server system 120. The identification-and-authentication service 110 can use the results of the comparison to detect data inaccuracies or questionable transaction behavior that may signify fraud. The identification-and-authentication service 110 can provide the host server system 104 with a warning if fraud is detected.

A mobile device 102 can include any computing device or other communication device operated by a user. The mobile device 102 can include one or more client applications 103. A client application 103, such as a web browser or a mobile application, can include executable instructions stored in one or more non-transitory computer-readable media. The mobile device 102 can also include one or more processing devices that are capable of executing the client application 103 to perform operations described herein. In some aspects, the client application 103 can provide one or more graphical interfaces through which a user can engage in mobile commerce with a host server system 104. For instance, the user or other entity accessing the mobile device 102 can use the client application 103 to query a set of sensitive or other controlled data, to engage in an online purchase transaction with a host server system 104 via an interactive computing environment 105, to access a certain content-modification feature of an online tool, etc. Examples of the interactive computing environment 105 include a mobile application, a web-based application accessible via mobile device, etc.

A telecommunication provider server system 120 can include any computing device or group of computing devices operated by a telecommunication or wireless network provider. The telecommunication provider server system 120 can include one or more server devices. The one or more server devices can include or can otherwise access one or more non-transitory computer-readable media. An authentication application 126 or one or more data sources 122 can be stored in one or more non-transitory computer-readable media. The data sources 122 can have any of the structures or configurations described with respect to the user data records 114 of the identification-and-authentication system 101. The telecommunication provider server system 120 can also include one or more processing devices that are capable of executing the authentication application 126 to perform operations described herein.

In some aspects, the authentication application 126 can provide an application programming interface through which the identification-and-authentication system 101 can query the telecommunication provider server system 120 and thereby acquire credential data 124. Credential data 124 can include data associated with a telecommunication account (e.g., a user's telecommunication account). For example, credential data 124 can include a legal name, a social security number, a credit card number, an account number, an address, a mobile phone number, a mobile account number, a proxy to a mobile account number, etc. The identification-and-authentication system 101 can compare the received credential data 124 with one or more credentials 116 of the user data records 114 to obtain identification data 118 about a particular individual or entity.

In some aspects, the identification-and-authentication system 101 can implement one or more procedures to secure communications between the identification-and-authentication system 101 and a mobile device 102, host server system 104, or a telecommunication provider server system 120. Non-limiting examples of features provided to protect data and transmissions between the identification-and-authentication system 101 and the mobile device 102, host server system 104, or the telecommunication provider server system 120 include secure web pages, encryption, firewall protection, network behavior analysis, intrusion detection, etc. In some aspects, transmissions with mobile devices 102, host server systems 104, or telecommunication provider server systems 120 can be encrypted using public key cryptography algorithms using a minimum key size of 128 bits. In additional or alternative aspects, website pages can be delivered through HTTPS or other secure server communications protocols. In additional or alternative aspects, electronic communications can be transmitted using Secure Sockets Layer ("SSL") technology or other suitable secure protocols. Extended Validation SSL certificates can be utilized to clearly identify a website's organization identity. In another non-limiting example, physical, electronic, and procedural measures can be utilized to safeguard data from unauthorized access and disclosure.

The identification-and-authentication system 101 can communicate with one or more mobile devices 102, host server systems 104, and telecommunication provider server systems 120 by applying authentication and authorization rules. The authentication and authorization rules can be used to authenticate and authorize the mobile device 102, host server system 104, or telecommunication provider server system 120 to receive information from the identification-and-authentication system 101.

In some aspects, the computing system 100, which includes the identity-and-authentication system 101 communicatively coupled to various telecommunication provider server systems 120, provides an improvement over typical fraud-detection computing systems. In one example, typical fraud prevention systems are limited to system-to-system communications between a host system, such as an e-commerce system, and a mobile device. These typical fraud prevention systems cannot utilize real-time data provided by telecommunication systems when detecting fraud, but must instead rely solely on data provided by the mobile device. Relying solely on data provided by the mobile device can, for example, allow false data from a location-services application on the mobile device to hide the mobile device's true location from the host system.

By contrast, the inclusion of the identity-and-authentication system 101, which interfaces with one or more telecommunication provider server systems 120 having access to an access point 107, which can include communication infrastructure through which the mobile device 102 accesses the data network 106, can allow for detecting the true geographic location of a mobile device (e.g., by pinging the mobile device 102 from a particular cell tower, by identifying the location of a router or an access point connecting the mobile device 102 to a network, etc.). In some aspects, this detection process cannot be defeated by merely reprogramming the location-based services on the mobile device 102 because the detection process involves communications that are out-of-band with respect to the mobile device and the host server system (e.g., communications with cell towers or routers). Thus, the computing system 100 includes devices, performs operations, or both that prevent electronic fraud in a manner that is different from conventional fraud-detection systems or processes that lack the involvement of a telecommunication provider server system 120.

In some aspects, the identity-and-authentication system 101 can communicate with the various telecommunication provider server systems 120 in a manner that is out of band with respect to the host server systems 104, the mobile devices 102, or both. For example, the communications between the identity-and-authentication system 101 and a telecommunication provider server system 120 can be performed via a separate communication channel, session, or both as compared to the communication channel or session established between the identity-and-authentication system 101 and a host server system 104. By using out-of-band communication channels, the network communications port can communicate with the mobile device 102, the host server system 104, and other systems substantially simultaneously during an electronic transaction while preventing these various devices and systems from directly communicating.

In some aspects, the identification-and-authentication system 101 communicating separately with the host server system 104 and the telecommunication provider server system 120 provides an improvement over typical systems. In one example, the identification-and-authentication system 101 can provide a trusted interface between multiple, independent host server systems and one or more telecommunication provider server systems 120. The trusted interface allows confidential data held by the telecommunication provider server system 120 to be shielded from the host server system 104 while allowing that confidential data to be used for preventing unauthorized use of the host server system 104. For instance, the telecommunication provider server system 120 may be able to pinpoint a specific location of the mobile device 102 (e.g., a particular grid coordinate), while the identification-and-authentication system 101 or the host server system 104 may only need more general location data (e.g., a country or city) to identify a potentially fraudulent use of the interactive computing environment 105. Using the identification-and-authentication system 101 as an interface between the host server system 104 and the telecommunication provider server system 120 allows the identification-and-authentication system 101 to limit the host server system 104 to information needed by the host server system 104, such as an indicator of fraud computed by the identification-and-authentication system 101 or a notification that the mobile device 102 is outside of a valid location.

In another example, as noted above, typical fraud prevention systems would rely solely on data provided from the mobile device to a host server system. This transmitted data may lack specific data needed to query a telecommunication provider system regarding a location of a mobile device. By contrast, the identification-and-authentication system 101 provides access to a large amount of data from user data records 114 that can be used to query a telecommunication provider server system 120. The identification-and-authentication system 101 can match data transmitted from the mobile device 102 (e.g., a telephone number) to one or more additional sets of data usable for querying a telecommunication provider server system 120. Examples of such query parameters include an entity identifier generated by the identification-and-authentication system 101 for tracking a common entity across multiple user data records 114, a full name, social security number, billing address, etc. This additional data can be kept confidential from the host server system 104 due to the identification-and-authentication system 101 communicating with the telecommunication provider server system 120 in a manner that is out of band with respect to the communication between the identification-and-authentication system 101 and the host server system 104. Thus, the computing system 100 allows for more accurate queries to a telecommunication provider server system 120 for location-based fraud detection while maintaining the security of sensitive data hosted by the identification-and-authentication system 101.

Figure 2:
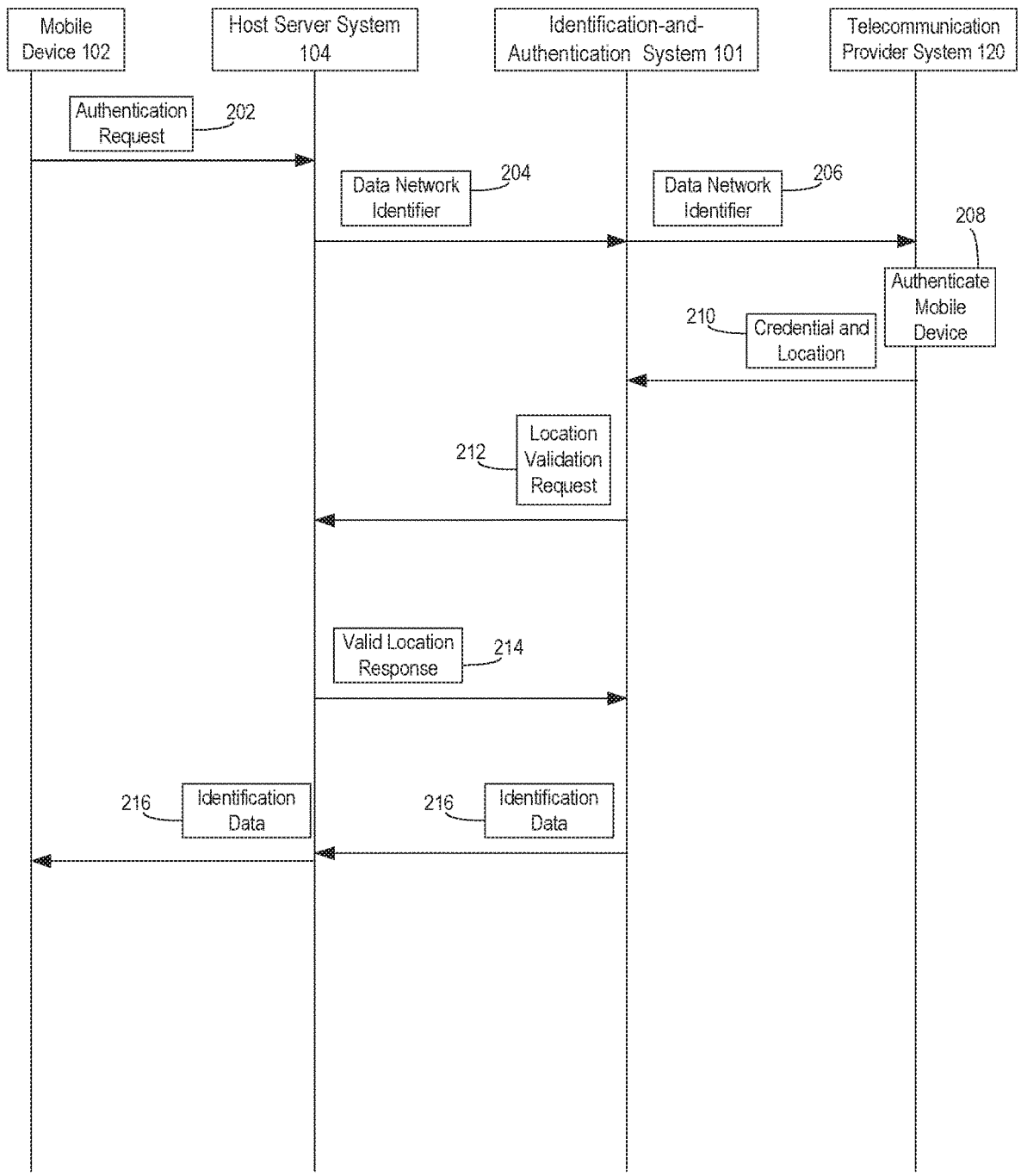
FIG. 2 depicts an example of a sequence of interactions among a mobile device, a host server system, an identification-and-authentication system, and a telecommunication provider system during a transaction in which the mobile device is in a location that does not indicate fraud, according to some aspects of the present disclosure.

Example of Location-Based Operations for Preventing Unauthorized Use of Interactive Computing Environment FIG. 2 is a sequence diagram depicting interactions among a mobile device 102, a host server system 104, an identification-and-authentication system 101, and a telecommunication provider server system 120 during a transaction in which the mobile device 102 is in a location that does not indicate fraud or other unauthorized use of the interactive computing environment 105. In this example, the mobile device 102 transmits a communication 202 to the host server system 104. The communication 202 can be transmitted during a session between a client application 103, which is executed on the mobile device 102, and an interactive computing environment 105, which is executed on the host server system 104. The mobile device 102 is used to perform one or more online transactions with the host server system 104 during the session.

The communication 202 includes an identification request for a user of the mobile device 102. The identification request includes, for example, a request to authenticate the user, a request to retrieve identification data 118 about the user for completion of an online transaction during the session, or some combination thereof. For instance, the identification request can be generated by clicking, in an interface provided by the interactive computing environment 105, an option to use authentication or identification services provided by the identification-and-authentication system 101.

The host server system 104 transmits a communication 204 to the identification-and-authentication system 101. The communication 204 includes a data network identifier and a request for information about the user of the mobile device 102. The data network identifier can be obtained by the interactive computing environment 105 via communications with the client application 103.

A data network identifier can include any information usable for uniquely identifying a computing device (e.g., a mobile device) on a data network. In some aspects, a data network identifier can include information that can be used on its own to identify a computing device (e.g., an IP address). In other aspects, a data network identifier can include information that can be used in combination with other information to identify a computing device.

The identification-and-authentication system 101 transmits a communication 206 to the telecommunication provider server system 120. The communication 206 includes the data network identifier received from the host server system 104. The telecommunication provider server system 120 performs one or more operations 208 for authenticating the mobile device 102.

If the telecommunication provider server system 120 successfully authenticates the mobile device 102, the telecommunication provider server system 120 transmits a responsive communication 210 to the identification-and-authentication system 101. In some aspects, the communication 210 includes location data for the mobile device 102 and credential data 124 for a user of the mobile device 102, as depicted in FIG. 2. But other implementations are possible. For example, in additional or alternative aspects, the communication 210 includes location data for the mobile device 102, and credential data 124 for a user of the mobile device 102 is obtained via a separate set of communications with the identification-and-authentication system 101. The separate set of communications with the identification-and-authentication system 101 is performed after the location data has been validated by the identification-and-authentication system 101, the host server system 104, or some combination thereof.

The identification-and-authentication system 101 transmits a communication 212 to the host server system 104. The communication 212 can include, for example, a location validation request. For instance, the identification-and-authentication system 101 can transmit the coordinates of the mobile device 102, a distance between the mobile device 102 and a location associated with the host server system 104, or some combination thereof. If the host server system 104 determines that the location data is not indicative of fraud, and that the location is therefore valid, the host server system 104 transmits a responsive communication 214 to the identification-and-authentication system 101. The responsive communication 214 includes data indicating that the location of the mobile device 102 is valid.

In some aspects, if the location of the mobile device 102 is valid, the identification-and-authentication system 101 transmits a communication 216 to the host server system 104, as depicted in FIG. 2. The communication 216 includes identification data 118 that is retrieved from one or more user data records 114. The host server system 104 then transmits a communication 216 to the mobile device 102 that includes the identification data 118. For example, an interface provided by an interactive computing environment 105 can be auto-populated with at least some of the identification data 118. The host server system 104 can transmit the updated interface to the mobile device 102 for use in the online transaction between the host server system 104 and the mobile device 102.

In additional or alternative aspects, if the location of the mobile device 102 is valid, the identification-and-authentication system 101 transmits the identification data 118 directly to the mobile device 102 (e.g., via a communication channel separate from communication channels between the host server system 104 and the mobile device 102 or between the host server system 104 and the identification-and-authentication system 101). The mobile device 102 can insert at least some of the identification data into an interface provided by the interactive computing environment 105 for use in the online transaction between the host server system 104 and the mobile device 102.

Figure 3:
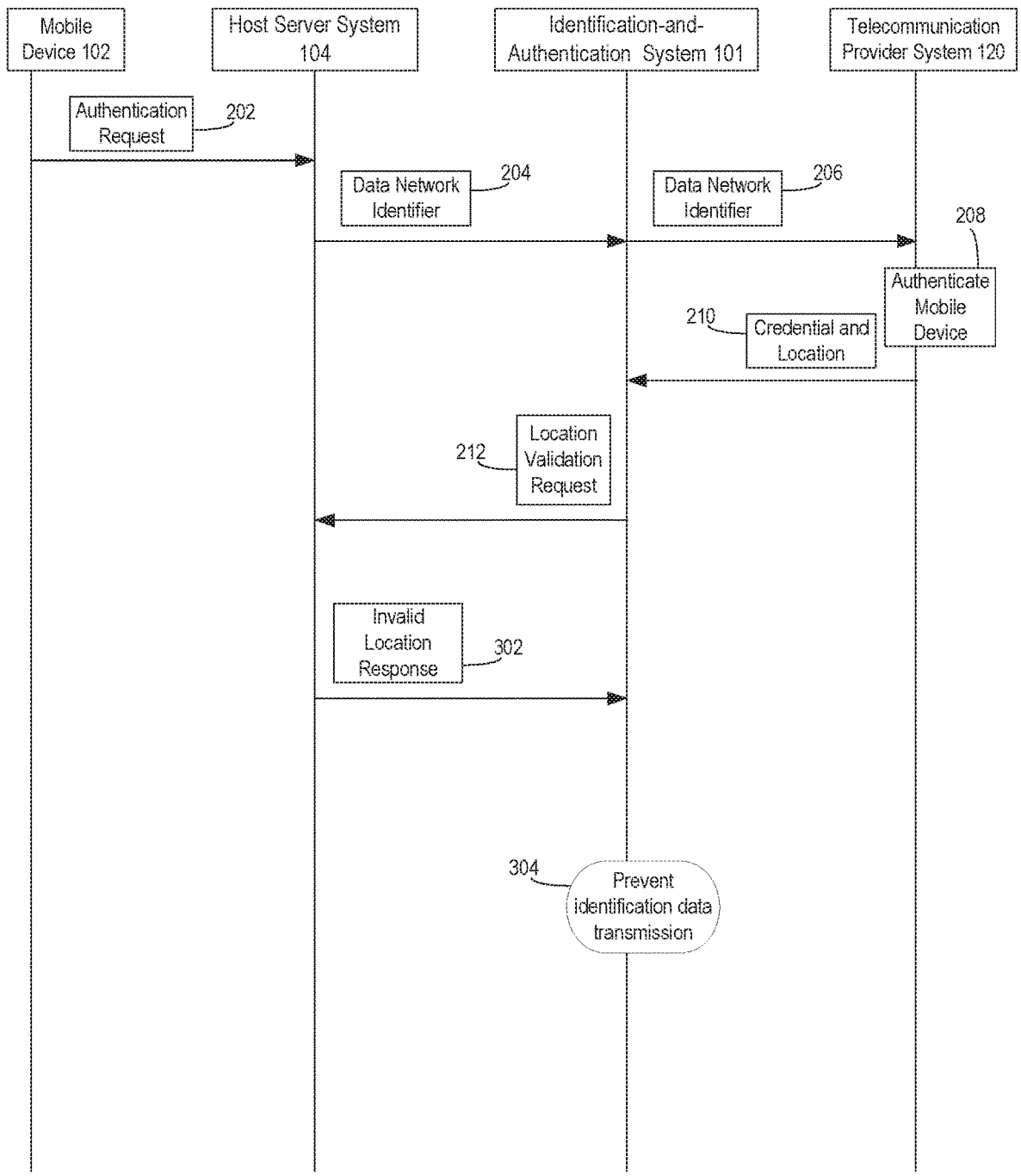
FIG. 3 depicts an example of a sequence of interactions among a mobile device, a host server system, an identification-and-authentication system, and a telecommunication provider system during a transaction in which the mobile device is in a location that does indicates fraud, according to some aspects of the present disclosure.

However, if the location is not valid, the communication flow depicted in FIG. 2 can be modified such that the identification-and-authentication service 110 does not provide identification data 118 for use in the online transaction. For instance, FIG. 3 is a sequence diagram depicting interactions during a transaction in which the mobile device is 102 is in a location that indicates one or more potentially fraudulent activities by a user of the mobile device 102. In this example, if the host server system 104 determines that the location data is indicative of fraud, the host server system 104 transmits a responsive communication 302 to the identification-and-authentication system 101. The responsive communication 214 includes data indicating that the location of the mobile device 102 is invalid (e.g., indicative of fraud).

Based on receiving the communication 302, the identification-and-authentication system 101 performs one or more operations 304 for preventing transmission of identification data 118 for use by the mobile device 102. In some aspects, the identification-and-authentication system 101 can terminate a process that would result in transmission of the identification data 118 from data security server 108 to the host server system 104 or the mobile device 102. For example, the identification-and-authentication system 101 can delete temporarily stored copies of the identification data 118 that were created for transmission to the host server system 104 or the mobile device 102.

Figure 4:
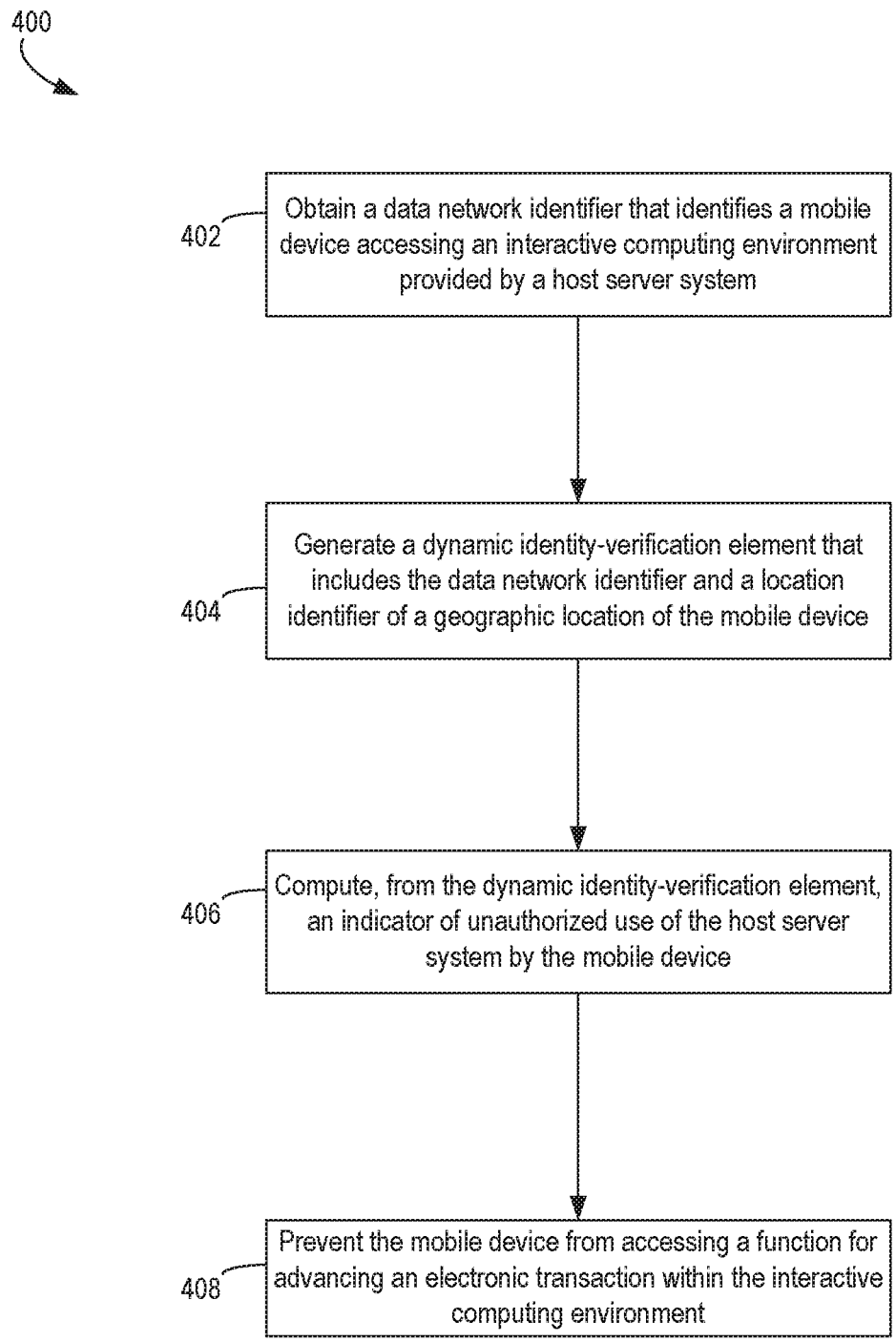
FIG. 4 depicts an example of a process for using the identification-and-authentication system of FIG. 1 to prevent unauthorized use of an interactive computing environment by a mobile device, according to some aspects of the present disclosure.

FIG. 4 is a flow chart illustrating an example of a process 400 for using the identification-and-authentication system 101 to facilitate fraud detection in online transactions between mobile devices and host server systems. For illustrative purposes, the process 400 is described with reference to implementations described above with respect to FIGS. 1-3. Other implementations, however, are possible. In some aspects, the steps in FIG. 4 may be implemented in program code that is executed by one or more computing devices such as the data security server 108 depicted in FIG. 1. In some aspects of the present disclosure, one or more operations shown in FIG. 5 may be omitted or performed in a different order. Similarly, additional operations not shown in FIG. 5 may be performed.

The process 400 involves a data security server 108 obtaining a data network identifier that identifies a mobile device 102 accessing an interactive computing environment 105 provided by the host server system 104, as depicted at block 402. In some aspects, the data security server 108 obtains the data network identifier during an electronic transaction between the mobile device 102 and the host server system 104, where the electronic transaction occurs within the interactive computing environment 105. The data security server 108 can obtain the data network identifier via a first communication channel with a host server system 104.

In one example, the identity-and-authentication service 110 can open a server port or transmit a query to the host server system 104 executing program code that provides the interactive computing environment 105. The host server system 104 can responsively transmit a data network identifier to the identification-and-authentication system 101 via the data network 106. In another example, the host server system 104 can "push" (i.e., transmit data without specifically receiving a request for the data) the data network identifier to the identification-and-authentication system 101.

The process 400 also involves the data security server 108 generating a dynamic identity-verification element that includes the data network identifier and a location identifier that identifies a geographic location of the mobile device 102, as depicted at block 404. The data security server 108 can generate the dynamic identity-verification element from communications with a server of a telecommunication provider server system 120. These communications can occur via a second communication channel that is out-of-band with respect to the first communication channel used to communicate with the host server system 104.

The dynamic identity-verification element can be a data structure that stores information used for evaluating whether the mobile device 102 is authorized to use one or more functions of the interactive computing environment 105. An example of the data structure is a table including a row for both the data network identifier and the location identifier, a set of linked nodes that include the data network identifier and the location identifier, etc.

In some aspects, the dynamic identity-verification element is a temporary data structure generated for a transaction between the mobile device 102 and the host server system 104. For instance, the dynamic identity-verification element could be created for the purpose of evaluating whether the mobile device 102 is authorized to use one or more functions of the interactive computing environment 105 and deleted based on a determination that the use is not authorized, a determination that the use is authorized, a completion of a transaction involved the authorized use of the interactive computing environment 105, etc.

In some aspects, the data security server 108 can generate the dynamic identity-verification element by obtaining location data from the telecommunication provider server system 120 and combining the data network identifier and the location identifier into the dynamic identity-verification element. The location identifier can include or be derived from location data received from the telecommunication provider server system 120 over the second communication channel. For instance, the data security server 108 can transmit a query to the telecommunication provider server system 120 that includes the data network identifier or some other query parameter, such as a credential used by both the data security server 108 and the telecommunication provider server system 120 to track particular users. The telecommunication provider server system 120 can service to this query by performing one or more operations that detect the location of the mobile device. This detection can include, for example, using an access point 107 of a data network managed by the telecommunication provider server system 120 to identify the location of the mobile device 102. Using the access point 107 can include pinging the mobile device 102 using an access point 107 such as a base station, determining that traffic from the mobile device 102 has been routed through the access point 107 during a recent time period, or otherwise determining that the mobile device 102 uses the access point 107 to connect to a data network 106. The telecommunication provider server system 120 can transmit location data, which identifies the detected location, to the identification-and-authentication system 101 and via the second communication channel.

Examples of a location identifier include absolute location data, such as a set of geographic coordinates for the mobile device 102, and relative location data, which indicates indicating a distance between a specified geographic location associated with the host server system 104 and the mobile device 102. In some aspects, the data security server 108 can derive relative location data by comparing a set of geographic coordinates for the mobile device 102, as provided by the telecommunication provider server system 120, to a known location associated with the host server system 104.

The process 400 also involves the data security server 108 computing, from the dynamic identity-verification element, an indicator of unauthorized use of the host server system 104 by the mobile device 102, as depicted at block 406. Computing the indicator of unauthorized use can include one or more operations performed by the identity-and-authentication service 110 to determine that the location of the mobile device 102 is indicative of fraudulent use of the interactive computing environment 105 or other unauthorized use of the interactive computing environment 105.

In some aspects, computing the indicator of unauthorized use can include matching the dynamic identity-verification element to a device-and-location combination indicating the unauthorized use. For instance, the identity-and-authentication service 110 can access data indicating a set of valid locations for the mobile device 102. In one example, this data could indirectly indicate a set of valid locations. For instance, if the data includes a set of decision rules indicating that certain locations (absolute or relative) of a mobile device are indicative of fraud, the set of valid locations could be locations outside the scope of the decision rules. Additionally or alternatively, this data could directly indicate a set of valid locations. For instance, if the data includes a set of decision rules indicating that certain locations (absolute or relative) of a mobile device are indicative of authorized use, those locations could be considered the set of valid locations. The identity-and-authentication service 110 can compare the location identifier from the dynamic identity-verification element to the set of valid locations. The identity-and-authentication service 110 could determine that the location identifier matches (or otherwise corresponds to) one or more locations from the set of valid locations. If so, the identity-and-authentication service 110 can output an indicator that the use of the interactive computing environment 105 is authorized or can decide not to output an indicator that the use of the interactive computing environment 105 is unauthorized. Alternatively, the identity-and-authentication service 110 could determine that the location identifier does not match (or otherwise correspond to) one or more locations from the set of valid locations or that the location identifier matches (or otherwise corresponds to) one or more locations from a set of invalid locations. If so, the identity-and-authentication service 110 can output an indicator that the use of the interactive computing environment 105 is unauthorized.

In additional or alternative aspects, computing the indicator of unauthorized use can include querying the host server system 104 regarding the location of the mobile device 102. Examples of these types of queries are depicted in FIGS. 2 and 3, described above. The identity-and-authentication service 110 can configure the network interface device to transmit a validation request, which has the location identifier, to the host server system 104. The identity-and-authentication service 110 can receive a response from the host server system 104. The identity-and-authentication service 110 can determine, from a response to the validation request, that the location of the mobile device is invalid and therefore indicates unauthorized use. Alternatively, the identity-and-authentication service 110 can determine, from a response to the validation request, that the location of the mobile device is valid and therefore indicates authorized use.

The process 400 also involves the data security server 108 preventing the mobile device 102 from accessing a function for advancing an electronic transaction within the interactive computing environment 105, as depicted at block 408. Preventing the mobile device from accessing the function can include one or more operations performed by the identity-and-authentication service 110 that result in at least one denial of access to the function at the mobile device 102.

In some aspects, preventing the mobile device from accessing the function can include preventing identification data, which is required for accessing the function, from being transmitted to the mobile device. For instance, the identity-and-authentication service 110 can pause or terminate a process that would result in the identification data (e.g., deleting retrieved identification data from a random-access memory). Examples of completing the function include accessing sensitive data from an access-controlled data source, completing a purchase via an e-commerce service, using a particular feature of an online software tool, etc. Identification data required for completing these functions could include, for example, providing a token indicating that a user is authorized to access certain data sources, providing name and address information required for a purchase, sending a confirmation that a user has permission to access a certain feature of a tool, etc. The identity-and-authentication service 110 can pause or terminate a process that would result in the identification data (e.g., address information, payment information, etc.) from being transmitted to the mobile device 102.

In additional or alternative aspects, the identity-and-authentication service 110 can use the dynamic identity-verification element to prevent identification data from being transmitted to the mobile device 102. For instance, the dynamic identity-verification element could include a flag field indicating whether the mobile device 102 (or a user of the mobile device 102) has been identified as engaging in potentially fraudulent activities or other unauthorized use of an interactive computing environment 105. At block 408, the identity-and-authentication service 110 can update the flag based on the indicator computed at block 406. The flag could indicate that the identity-and-authentication service 110 is prohibited from transmitting identification data to the mobile device 102, to a host server system 104 involved in an online transaction with the mobile device 102, or some combination thereof. In some aspects, the identity-and-authentication service 110 could subsequently change the flag value to remove this prohibition if, for example, a threshold amount of time has passed, a valid location is later associated with the mobile device 102, additional verification data has been received from the mobile device 102, additional verification data has been received from the host server system 104, or some combination thereof.

In additional or alternative aspects, preventing the mobile device from accessing the function can include automatically transmitting a control signal to the host server system 104 that causes the host server system 104 to prevent the mobile device from accessing the function. For example, a control signal could include a warning or other notification that the identity-and-authentication service 110 has computed an indicator of unauthorized use. The identity-and-authentication service 110 can configure a network interface device of the identification-and-authentication system 101 to transmit the control signal to the host server system 104. The host server system 104 can perform, based on receiving the control signal, one or more operations for preventing the mobile device from accessing the function. Examples of these operations include terminating a session between the mobile device 102 and the host server system 104, requiring the input of additional verification data (e.g., knowledge-based authentication data, biometrics, etc.) at the mobile device 102 before providing access to the function of the interactive computing environment 105, rejecting a request to access the function, etc.

Figure 5:
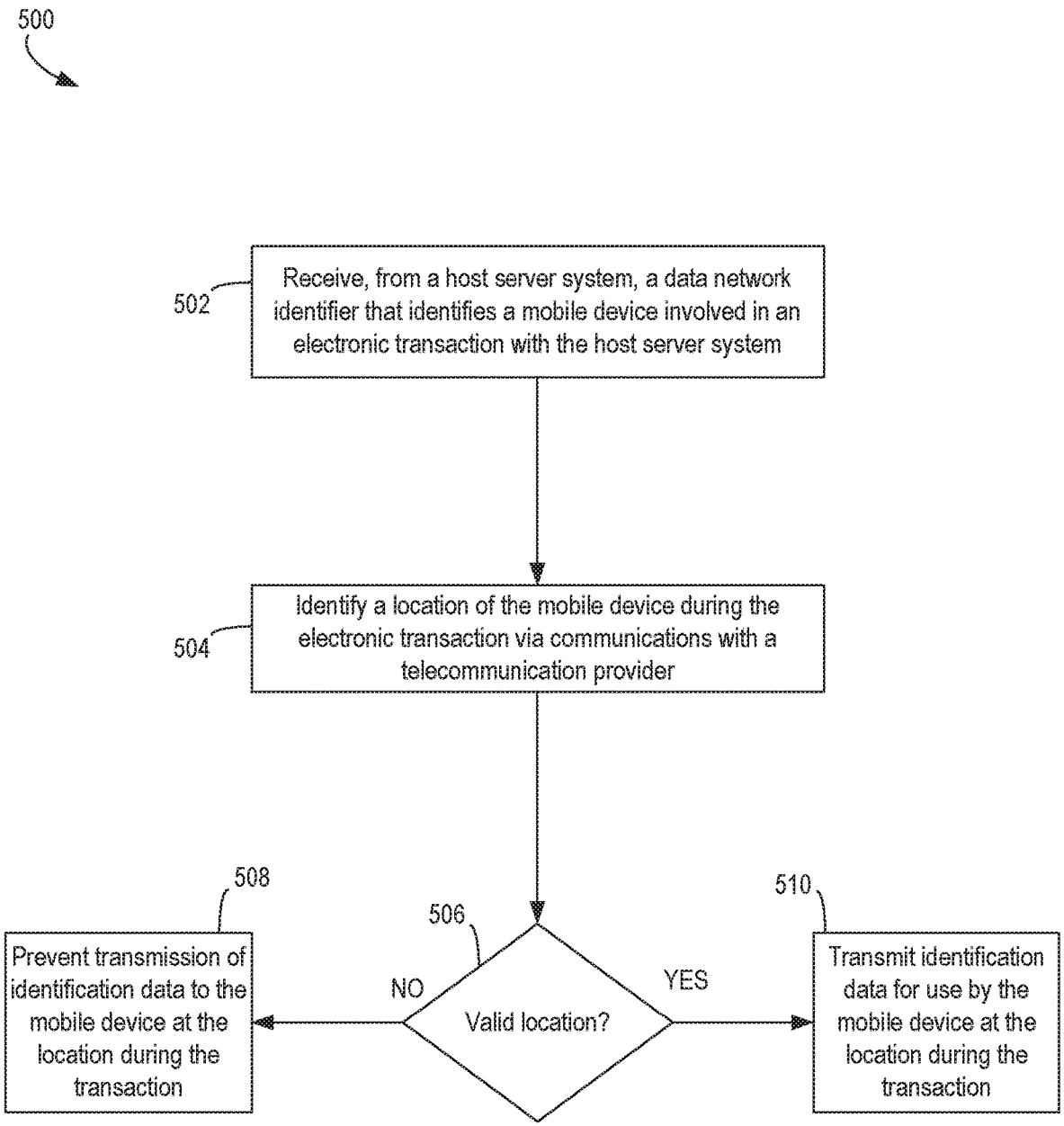
FIG. 5 depicts an example of a process for using the identification-and-authentication system of FIG. 1 to facilitate detection of unauthorized use of an interactive computing environment, according to some aspects of the present disclosure.

FIG. 5 is a flow chart illustrating an example of a process 500 for using the identification-and-authentication system 101 to facilitate detection of unauthorized use in online transactions between mobile devices and host server systems. For illustrative purposes, the process 500 is described with reference to implementations described above with respect to FIGS. 1-4. Other implementations, however, are possible. In some aspects, the steps in FIG. 5 may be implemented in program code that is executed by one or more computing devices such as the data security server 108 depicted in FIG. 1. In some aspects, one or more operations shown in FIG. 5 may be omitted, performed in a different order, or combined with other operations described herein, such as operations described above with respect to FIG. 4. Similarly, additional operations not shown in FIG. 5 may be performed.

The process 500 involves obtaining a data network identifier that identifies a mobile device involved in an electronic transaction with a host server system, as depicted at block 502. For example, the data security server 108 can obtain the data network identifier in a manner similar to the operations described above with respect to block 402 of the process 400.

The process 500 also involves the data security server 108 identifying a location of the mobile device during the online transaction via communications with a telecommunication provider, as depicted at block 504. The data security server 108 can execute the identity-and-authentication service 110 and thereby perform one or more operations for obtaining location data for the mobile device using the data network identifier. In some aspects, the data security server 108 can use the location data to generate the dynamic identity-verification element, as described above with respect to block 404 of the process 400.

In some aspects, the identity-and-authentication service 110 can configure a network interface device to transmit query data associated with the data network identifier to a telecommunication provider server system 120. The identity-and-authentication service 110 can establish and transmit the query data to the telecommunication provider server system 120 over a secure data connection. The telecommunication provider server system 120 can receive the query data network identifier. The telecommunication provider server system 120 can communicate with one or more access points (e.g., base stations, microcells, routers, etc.) used by the telecommunication provider server system 120 to provide telecommunication service to the mobile device 102, to provide the mobile device 102 with access to one or more data networks 106, etc. The telecommunication provider server system 120 can determine, based on a location of one or more access points in communication with the mobile device 102, that the mobile device 102 is located in a particular area. The telecommunication provider server system 120 can transmit location data to the identification-and-authentication system 101 via one or more data networks.

In some aspects, the telecommunication provider server system 120 can also use the data network identifier to identify an associated credential from one or more data sources 122. For instance, the telecommunication provider server system 120 can receive a data network identifier including an IP address and determine an associated credential including a social security number. The telecommunication provider server system 120 can transmit the credential to the identification-and-authentication system 101. The telecommunication provider server system 120 can also transmit other information to the identification-and-authentication system 101. The other information can include an account status (active, suspended, blacklisted, etc.), a mobile phone number, Subscriber Identity Module ("SIM") card information, etc.

The process 500 also involves determining that a location for the mobile device is valid, as depicted at block 506. The data security server 108 can execute the identity-and-authentication service 110 and thereby perform one or more operations that involve validating the location of the mobile device. In some aspects, operations performed at block 506 can be used to implement block 406 of the process 400.

In some aspects, these operations can include performing further fraud-detection analysis based on the location data. Examples of the location data include an absolute location of the mobile device, such as a set of geographic coordinates for the mobile device, and relative location data, such as data indicating a distance between the mobile device 102 and a specified geographic location, such as a store, associated with the host server system 104. The host server system 104, the data security server 108, or some combination thereof can determine whether the location data for the mobile device 102 is indicative of fraud. For instance, if the distance between the mobile device 102 and a specified geographic location exceeds a certain threshold, a user of the mobile device 102 may not be authorized to complete the online transaction for the interactive computing environment. In a simplified example, if a promotion is only valid at a certain store and the mobile device 102 is not within a threshold distance of the store, a user of the mobile device 102 may be barred from taking advantage of the promotion.

If the host server system 104 determines that the location of the mobile device is indicative of fraud, the host server system 104 can communicate information to the identification-and-authentication service 110 indicating the potential fraud. Based on the information, the identification-and-authentication service 110 can determine that the location of the mobile device is invalid for the online transaction. If the host server system 104 determines that the location of the mobile device is not indicative of fraud, the host server system 104 can communicate information to the identification-and-authentication service 110 indicating the absence of potential fraud. Based on the information, the identification-and-authentication service 110 can determine that the location of the mobile device is valid for the online transaction.

In additional or alternative aspects, the identification-and-authentication service 110 can perform one or more fraud-detection operations to determine if the location is valid. For example, the identification-and-authentication service 110 may access, from a network-attached storage unit 112 or another non-transitory computer-readable medium, one or more decision rules. In some aspects, the decision rules are provided by the host server system 104. The decision rules may indicate that certain locations (absolute or relative) of a mobile device are indicative of fraud. The identification-and-authentication service 110 can apply one or more of the decision rules and thereby determine whether the location of the mobile device is indicative of fraud. If so, the identification-and-authentication service 110 can determine that the location of the mobile device is invalid for the online transaction. If not, the identification-and-authentication service 110 can determine that the location of the mobile device is valid for the online transaction.

If the location is valid, the process 500 also involves the data security server 108 transmitting the second identification data for use by the second mobile device at the second location during the transaction, as depicted in block 508. The data security server 108 can execute the identity-and-authentication service 110 and thereby perform one or more operations for transmitting the identification data to a computing device executing the interactive computing environment 105. In some aspects, the identity-and-authentication service 110 can configure a network interface device to transmit a suitable electronic communication (e.g., an Extensive Markup Language ("XML") document, a web page, an e-mail, etc.) to a host server system 104 that executes the interactive computing environment 105. In some aspects, the identity-and-authentication service 110 can configure a network interface device to transmit a suitable electronic communication (e.g., an Extensive Markup Language ("XML") document, a web page, an e-mail, etc.) to mobile device 102 for use by a client application 103.

The data security server 108 can obtain the identification data 118 for transmission in any suitable manner. For example, the data security server 108 can use the data network identifier to obtain, via communications with a telecommunication provider server system 120, credential data 124 associated with the mobile device 102, as depicted in FIGS. 2 and 3. The data security server 108 can execute the identity-and-authentication service 110 and thereby perform one or more operations for retrieving identification data from a credit file associated with the credential. The data security server 108 can retrieve identification data 118 from a user data record 114 by matching the received credential data 124 with one or more credentials 116. For example, the identity-and-authentication service 110 can compare the credential data 124 received from the telecommunication provider server system 120 with the one or more credentials 116 stored in the network-attached storage unit 112. The identity-and-authentication service 110 can identify, based on the comparison, an associated credit file or other user data record 114 that includes a corresponding credential 116. The identity-and-authentication service 110 can retrieve identification data 118 from the credit file or other user data record 114. The identification data 118 can be usable for completing the online transaction between the mobile device 102 and the host server system 104.

If the location is not valid, the process 500 also involves preventing identification data from being transmitted to the mobile device at the location during the transaction, as depicted in block 510. The data security server 108 can execute the identity-and-authentication service 110 and thereby perform one or more operations for implementing block 510. In some aspects, the data security server 108 can pause or terminate a process that would result in the identification data (e.g., deleting retrieved identification data from a random-access memory).

Example of Computing System for Location-Based Fraud Detection Operations

Figure 6:
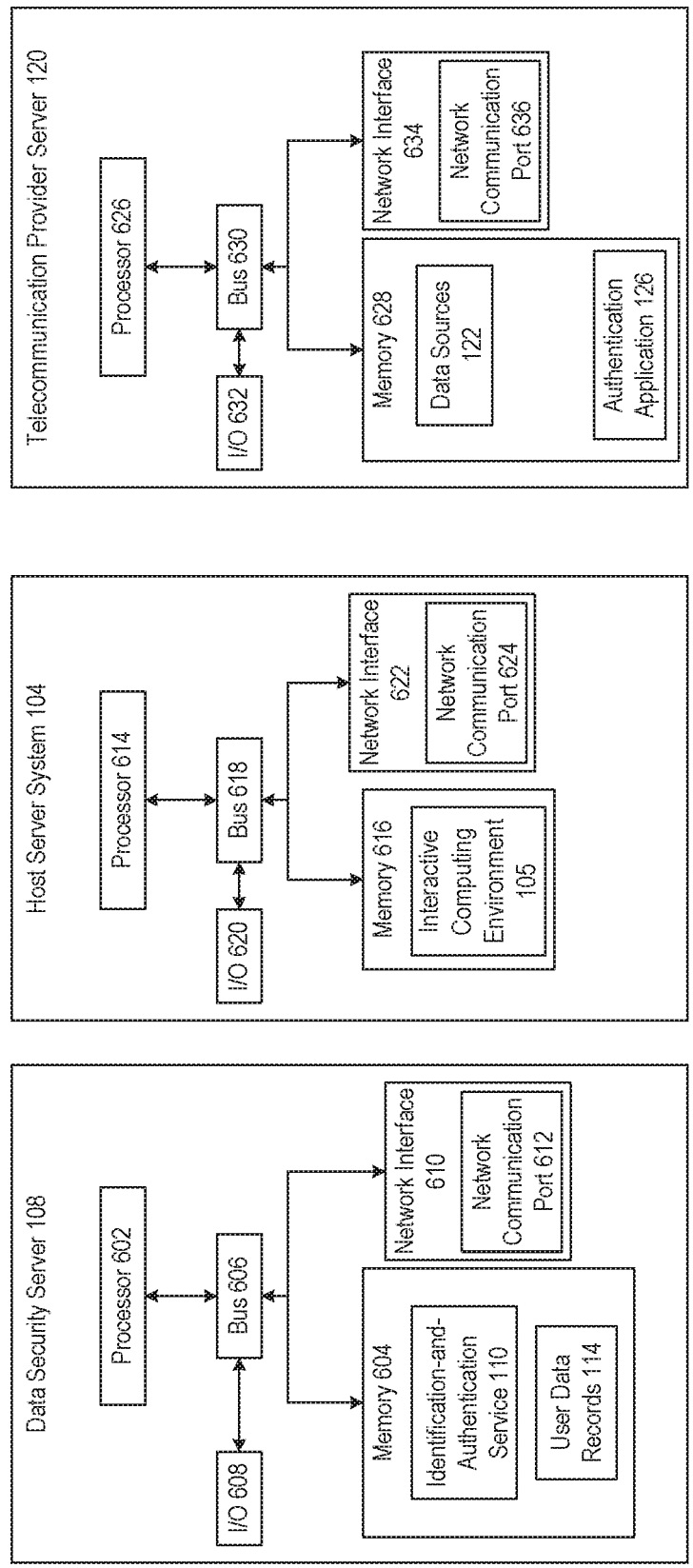
FIG. 6 depicts an example of a computing system for performing location-based operations for preventing fraudulent use of host server systems, according to some aspects of the present disclosure.

Any suitable computing system or group of computing systems can be used to perform the fraud detection, identity verification, and other operations described herein. For example, FIG. 6 is a block diagram depicting an example of a data security server 108, a host server system 104, and a telecommunication provider server system 120. These examples can include various devices for implementing various systems and devices depicted in FIG. 1. The data security server 108 can include various devices for performing one or more fraud detection, identity verification, and other operations described above with respect to FIGS. 1-5.

The data security server 108, the host server system 104, and the telecommunication provider server system 120 can respectively include processors 602, 614, and 626. The processors 602, 614, and 626 can be communicatively coupled to memory devices 604, 616, and 628, respectively. Each processor executes computer-executable program code stored in a communicatively coupled memory device, accesses information stored in the communicatively coupled memory device, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor include a microprocessor, an application-specific integrated circuit, a field-programmable gate array, or any other suitable processing device. The processor can include any number of processing devices.

Each of the memory devices 604, 616, and 628 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

Each of data security server 108, the host server system 104, and the telecommunication provider server system 120 can also include a number of external or internal devices such as input or output devices. For example, the data security server 108, the host server system 104, and the telecommunication provider server system 120 can respectively include buses 606, 618, and 630. A bus can communicatively couple one or more components of a given server system. The data security server 108, the host server system 104, and the telecommunication provider server system 120 can respectively include input/output interfaces 608, 620, and 632. The input/output interfaces 608, 620, and 632 can receive input from input devices or provide output to output devices.

The data security server 108 can execute program code that includes the identification-and-authentication service 110. The program code for the identification-and-authentication service 110 may be resident in any suitable computer-readable medium and may be executed on any suitable processing device. For example, as depicted in FIG. 6, the program code for the identification-and-authentication service 110 can reside in the memory device 604 at the data security server 108. Executing the identification-and-authentication service 110 can configure the processor 602 to perform the operations described herein with respect to FIGS. 1-5. In some aspects, the user data records 114 can also be stored in the memory 604.

The host server system 104 can execute program code that includes the interactive computing environment 105. The program code for the interactive computing environment 105 may be resident in any suitable computer-readable medium and may be executed on any suitable processing device. For example, as depicted in FIG. 6, the program code for the interactive computing environment 105 can reside in the memory device 616 at the host server system 104. Executing the interactive computing environment 105 can configure the processor 602 to perform the operations described herein with respect to FIGS. 1-5.

The telecommunication provider server system 120 can execute program code that includes the authentication application 126. The program code for the authentication application 126 may be resident in any suitable computer-readable medium and may be executed on any suitable processing device. For example, as depicted in FIG. 6, the program code for the authentication application 126 can reside in the memory device 628 at the telecommunication provider server system 120. Executing the authentication application 126 can configure the processor 602 to perform the operations described herein with respect to FIGS. 1-5. In some aspects, the data sources 122 can also be stored in the memory 604.

In some aspects, the data security server 108, the host server system 104, and the telecommunication provider server system 120 can respectively include network interface devices 610, 622, and 634. A network interface device can include any device or group of devices suitable for establishing a wired or wireless data connection to one or more data networks 106. Non-limiting examples of the network interface device include an Ethernet network adapter, a modem, etc. The network interface devices 610, 622, and 634 can respectively include one or more network communications ports 612, one or more network communications ports 624, and one or more network communications ports 636. An address or other identifier of a network communication port can used for communications with various other devices (e.g., a mobile device 102, a host server system 104, etc.).

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A system comprising:
   a telecommunication provider server configured for detecting a location of a mobile device;
   a host server configured for conducting, with the mobile device, an electronic transaction within an interactive computing environment accessible over a data network; and
   an identification-and-authentication system communicatively coupled to (i) the host server via a first communication channel and (ii) the telecommunication provider server via a second communication channel that is out-of-band with respect to the first communication channel, wherein the identification-and-authentication system is configured for:
      obtaining, via the first communication channel, a data network identifier that identifies the mobile device,
      generating, based on communications with the telecommunication provider server via the second communication channel, a dynamic identity-verification element comprising (i) the data network identifier and (ii) a location identifier that identifies a geographic location of the mobile device, matching the dynamic identity-verification element to a device-and-location combination, and determining an indication of the device-and-location combination, wherein:

based on the device-and-location combination indicating unauthorized use of the host server by the mobile device, the identification-and-authentication system automatically transmits a control signal to the host server, wherein the host server is further configured for preventing, responsive to the control signal, the mobile device from accessing a function for advancing the electronic transaction within the interactive computing environment, and based on the device-and-location combination indicating authorized use of the host server by the mobile device, the identification-and-authentication system (a) retrieves identification information required for advancing the electronic transaction within the interactive computing environment, and (b) transmits the identification information to one or more of the mobile device or the host server, wherein transmitting the identification information causes the host server to provide the mobile device with access to the function for advancing the electronic transaction.

2. The system of claim 1, wherein the telecommunication provider server is further configured for:

detecting the location of the mobile device using an access point of the data network managed by the telecommunication provider server; and transmitting, to the identification-and-authentication system, location data identifying the detected location, wherein the identification-and-authentication system is configured for generating the dynamic identity-verification element by (i) obtaining the location identifier from the location data and (ii) combining the data network identifier and the location identifier into the dynamic identity-verification element.

3. The system of claim 1, wherein matching the dynamic identity-verification element to the device-and-location combination comprises:

accessing data identifying a set of valid locations for the mobile device, wherein the device-and-location combination indicating unauthorized use is based on determining that the set of valid locations lacks the geographic location identified by the location identifier in the dynamic identity-verification element.

4. The system of claim 1, wherein the identification-and-authentication system is further configured for:

obtaining, via the first communication channel with the host server, an additional data network identifier that identifies an additional mobile device accessing the interactive computing environment;

generating, from communications with the telecommunication provider server via the second communication channel, an additional dynamic identity-verification element comprising (i) the additional data network identifier and (ii) an additional location identifier that identifies a geographic location of the additional mobile device; and matching the additional dynamic identity-verification element to an additional device-and-location combination, wherein:

based on the additional device-and-location combination indicating unauthorized use of the host server by the additional mobile device, the identification-and-authentication system automatically transmits an additional control signal to the host server, the host server being further configured for preventing, responsive to the control signal, the additional mobile device from accessing the function, and based on the additional device-and-location combination indicating authorized use of the host server by the additional mobile device, the identification-and-authentication system (a) retrieves additional identification information required for advancing an additional electronic transaction within the interactive computing environment, and (b) transmits the additional identification information to one or more of the additional mobile device or the host server.

5. The system of claim 1, wherein the location identifier comprises one or more of:

relative location data indicating a distance between (i) a specified geographic location associated with the host server and (ii) the mobile device; or a set of geographic coordinates for the mobile device.

6. A method in which one or more processing devices of an identification-and-authentication system perform operations comprising:

obtaining, via a first communication channel with a host server, a data network identifier that identifies a mobile device accessing an interactive computing environment provided by the host server;

generating, from communications with a telecommunication provider server via a second communication channel that is out-of-band with respect to the first communication channel, a dynamic identity-verification element comprising (i) the data network identifier and (ii) a location identifier that identifies a geographic location of the mobile device;

matching the dynamic identity-verification element to a device-and-location combination; and determining an indication of the device-and-location combination, wherein:

based on the device-and-location combination indicating unauthorized use of the host server by the mobile device, the mobile device is prevented from accessing a function for advancing an electronic transaction within the interactive computing environment, and based on the device-and-location combination indicating authorized use of the host server by the mobile device, (a) identification information required for advancing the electronic transaction within the interactive computing environment is retrieved, and (b) the identification information is transmitted to one or more of the mobile device or the host server, wherein transmitting the identification information causes the host server to provide the mobile device with access to the function for advancing the electronic transaction.

7. The method of claim 6, wherein preventing the mobile device from accessing the function comprises preventing identification data that is required for accessing the function from being transmitted to the mobile device.

8. The method of claim 6, wherein preventing the mobile device from accessing the function comprises automatically transmitting a control signal to the host server that causes the host server to prevent the mobile device from accessing the function.

9. The method of claim 6, wherein matching the dynamic identity-verification element to the device-and-location combination comprises:

accessing data identifying a set of valid locations for the mobile device, wherein
the device-and-location combination indicating unauthorized use is based on determining that the set of valid locations lacks the geographic location identified by the location identifier in the dynamic identity-verification element.

10. The method of claim 6, wherein the location identifier comprises relative location data indicating a distance between (i) a specified geographic location associated with the host server and (ii) the mobile device.

11. The method of claim 6, wherein the location identifier comprises a set of geographic coordinates for the mobile device.

12. The method of claim 6, the operations further comprising:
obtaining, via the first communication channel with the host server, an additional data network identifier that identifies an additional mobile device accessing the interactive computing environment;
generating, from communications with the telecommunication provider server via the second communication channel, an additional dynamic identity-verification element comprising (i) the additional data network identifier and (ii) an additional location identifier that identifies a geographic location of the additional mobile device; and
matching the additional dynamic identity-verification element to an additional device-and-location combination, wherein:
based on the additional device-and-location combination indicating unauthorized use of the host server by the additional mobile device, the host server is configured for preventing the additional mobile device from accessing the function, and
based on the additional device-and-location combination indicating authorized use of the host server by the additional mobile device, (a) additional identification information is retrieved, the additional identification information being required for advancing an additional electronic transaction within the interactive computing environment, and (b) the additional identification information is transmitted to one or more of the additional mobile device or the host server.

13. An identification-and-authentication system comprising:
a network interface device communicatively coupled to (i) a host server via a first communication channel and (ii) a telecommunication provider server via a second communication channel that is out-of-band with respect to the first communication channel;
a non-transitory computer-readable medium storing instructions; and
a processing device communicatively coupled to the network interface device and the non-transitory computer-readable medium,
wherein the processing device is configured to execute the instructions and thereby perform operations comprising:
obtaining, via the first communication channel, a data network identifier that identifies a mobile device accessing an interactive computing environment provided by the host server,
generating, from communications with a telecommunication provider server via the second communication channel that is out-of-band with respect to the first communication channel, a dynamic identity-verification element comprising (i) the data network identifier and (ii) a location identifier that identifies a geographic location of the mobile device, and
computing, from the dynamic identity-verification element, an indication of a device-and-location combination, wherein:
based on the device-and-location combination indicating unauthorized use of the host server by the mobile device, the mobile device is prevented from accessing a function for advancing an electronic transaction within the interactive computing environment, and
based on the device-and-location combination indicating authorized use of the host server by the mobile device, (a) identification information required for advancing the electronic transaction within the interactive computing environment is retrieved, and (b) the identification information is transmitted to one or more of the mobile device or the host server, wherein transmitting the identification information causes the host server to provide the mobile device with access to the function for advancing the electronic transaction.

14. The identification-and-authentication system of claim 13, wherein preventing the mobile device from accessing the function comprises configuring the network interface device to transmit, to the host server, a control signal configured for causing the host server to prevent the mobile device from accessing the function.

15. The identification-and-authentication system of claim 13, wherein the computing the indication of the device-and-location combination comprises matching the dynamic identity-verification element to the device-and-location combination, wherein the matching comprises:
accessing data identifying a set of valid locations for the mobile device, wherein
the device-and-location combination indicating unauthorized use is based on determining that the set of valid locations lacks the geographic location identified by the location identifier in the dynamic identity-verification element.

16. The identification-and-authentication system of claim 13, wherein computing the indication of the device-and-location combination comprises:
configuring the network interface device to transmit, to the host server, a validation request having the location identifier, wherein
the device-and-location combination indicating unauthorized use is based on determining, from a response to the validation request, that the geographic location of the mobile device is invalid.

17. The identification-and-authentication system of claim 16, wherein preventing the mobile device from accessing the function comprises preventing, based on determining that the geographic location of the mobile device is invalid, the identification information that is required for accessing the function from being transmitted to the mobile device.

18. The identification-and-authentication system of claim 13, wherein the location identifier comprises relative location data indicating a distance between (i) a specified geographic location associated with the host server and (ii) the mobile device.

19. The identification-and-authentication system of claim 13, wherein the location identifier comprises a set of geographic coordinates for the mobile device.

20. The identification-and-authentication system of claim 13, the operations further comprising:

obtaining, via the first communication channel with the host server, an additional data network identifier that identifies an additional mobile device accessing the interactive computing environment;

generating, from communications with the telecommunication provider server via the second communication channel, an additional dynamic identity-verification element comprising (i) the additional data network identifier and (ii) an additional location identifier that identifies a geographic location of the additional mobile device; and matching the additional dynamic identity-verification element to an additional device-and-location combination, wherein:

based on the additional device-and-location combination indicating unauthorized use of the host server by the additional mobile device, the host server is configured for preventing the additional mobile device from accessing the function, and based on the additional device-and-location combination indicating authorized use of the host server by the additional mobile device, (a) additional identification information is retrieved, the additional identification information being required for advancing an additional electronic transaction within the interactive computing environment, and (b) the additional identification information is transmitted to one or more of the additional mobile device or the host server.

* * * * *